United States Patent
Koganehira et al.

(10) Patent No.: US 9,876,921 B2
(45) Date of Patent: Jan. 23, 2018

(54) CONTROLLER TO CONTROL TANK FILLING WITH A LIQUID

(71) Applicant: SEIKO EPSON CORPORATION, Tokyo (JP)

(72) Inventors: Shuichi Koganehira, Matsumoto (JP); Yasuhiko Kosugi, Matsumoto (JP); Tomohiko Sano, Shiojiri (JP); Kenji Matsumoto, Chino (JP); Kenta Masuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/423,690

(22) PCT Filed: Aug. 28, 2013

(86) PCT No.: PCT/JP2013/005083
§ 371 (c)(1),
(2) Date: Feb. 24, 2015

(87) PCT Pub. No.: WO2014/034109
PCT Pub. Date: Mar. 6, 2014

(65) Prior Publication Data
US 2015/0298461 A1    Oct. 22, 2015

(30) Foreign Application Priority Data
Aug. 31, 2012   (JP) .................... 2012-192404

(51) Int. Cl.
*H04N 1/00*   (2006.01)
*B41J 2/175*   (2006.01)

(52) U.S. Cl.
CPC .......... *H04N 1/00506* (2013.01); *B41J 2/175* (2013.01); *B41J 2/17509* (2013.01); *B41J 2/17546* (2013.01); *B41J 2/17566* (2013.01)

(58) Field of Classification Search
CPC .... B41J 2/175; B41J 2/17566; B41J 2/17546; B41J 2/17509; H04N 1/00506
(Continued)

(56) References Cited

U.S. PATENT DOCUMENTS

| 6,011,937 A | 1/2000 | Chaussade et al. |
| 6,428,132 B1 | 8/2002 | Kubatzki et al. |

(Continued)

FOREIGN PATENT DOCUMENTS

| CN | 2693465 Y | 4/2004 |
| EP | 0813120 | 12/1997 |

(Continued)

OTHER PUBLICATIONS

PCT/JP2013/005083, International Search Report dated Oct. 15, 2013. (2 pages).

(Continued)

*Primary Examiner* — Sharon A Polk
(74) *Attorney, Agent, or Firm* — Workman Nydegger

(57) ABSTRACT

An object is to improve a user's convenience. There is provided a control unit for use in a liquid ejecting apparatus using a tank containing a liquid and a storage material attachable to and detachable from the liquid ejecting apparatus, and storing an amount of the liquid in the tank. After the storage material is not mounted on a predetermined place, the control unit receives an answer for a question to ask whether or not the liquid is injected to the tank.

17 Claims, 8 Drawing Sheets

(58) Field of Classification Search
USPC .......................................... 347/7, 14, 84, 85
See application file for complete search history.

(56) References Cited

U.S. PATENT DOCUMENTS

| | | | | |
|---|---|---|---|---|
| 6,498,905 | B1* | 12/2002 | Tsuruya | G03G 21/1889 399/12 |
| 7,571,985 | B2* | 8/2009 | Sanada | B41J 2/14233 347/50 |
| 7,600,835 | B2 | 10/2009 | Moriyama et al. | |
| 7,850,263 | B2 | 12/2010 | Shinada et al. | |
| 2002/0196312 | A1* | 12/2002 | Ishizawa | B41J 2/175 347/50 |
| 2008/0001985 | A1* | 1/2008 | Hatasa | B41J 2/17546 347/19 |
| 2008/0273883 | A1* | 11/2008 | Kim | B41J 2/17546 399/12 |
| 2011/0292102 | A1* | 12/2011 | Asauchi | B41J 2/17546 347/5 |
| 2012/0044285 | A1 | 2/2012 | Ogasawara et al. | |
| 2012/0050359 | A1 | 3/2012 | Koganehira et al. | |
| 2012/0056938 | A1* | 3/2012 | Ishizawa | B41J 2/175 347/44 |
| 2012/0092716 | A1* | 4/2012 | Ichimura | B41J 2/16505 358/1.15 |
| 2015/0298461 | A1 | 10/2015 | Koganehira et al. | |

FOREIGN PATENT DOCUMENTS

| | | |
|---|---|---|
| EP | 1297961 | 4/2003 |
| JP | 2002-120382 A | 4/2002 |
| JP | 2003011469 | 1/2003 |
| JP | 2005-053110 | 3/2005 |
| JP | 2007-253396 A | 10/2007 |
| JP | 2007-320096 | 12/2007 |
| JP | 2008187468 A | 8/2008 |
| JP | 2008-254395 | 10/2008 |
| JP | 2012-111167 | 6/2012 |

OTHER PUBLICATIONS

Extended European Search Report for counterpart application EP 13833311.7 dated Jan. 31, 2017.

* cited by examiner

Fig. 6

| ITEM / CONSUMPTION COUNTER C(%) | 1. DISPLAY ON DISPLAY PANEL | 2. WRITE ON CHIP UNIT | 3. PRINTING OPERATION | 4. PRINTING OPERATION WHEN CHIP UNIT IS REMOVED |
|---|---|---|---|---|
| A. C<100 | PRINTABLE | YES | CONTINUE | STOP |
| B. 100≤C<106 (100+a) | REPLACEMENT TIME | NO | CONTINUE | CONTINUE |
| C. 106≤C<112 (100+2a) | WARNING OF STOPPAGE OF PRINTING | NO | CONTINUE | CONTINUE |
| D. 112≤C | REPLACEMENT TIME EXCEEDED | NO | STOP | — (STOPPED ALREADY) |

Fig. 10

| ITEM / CONSUMPTION COUNTER C(%) | 1. DISPLAY ON DISPLAY PANEL | 2. PRINTING OPERATION |
|---|---|---|
| A. C < 100 | REPLACEMENT TIME EXCEEDED | — (STOPPED ALREADY) |
| B. C ≥ 100 | ⟨MAINTAIN⟩ | CONTINUE |

Fig. 11

| ITEM / CONSUMPTION COUNTER C(%) | 1. DISPLAY ON DISPLAY PANEL | 2. PRINTING OPERATION |
|---|---|---|
| A. C < 100 | CHIP UNIT ERROR | — (STOPPED ALREADY) |
| B. C ≥ 100 | ⟨MINUTE MODIFICATION⟩ | CONTINUE |

CONTROLLER TO CONTROL TANK FILLING WITH A LIQUID

TECHNICAL FIELD

The present invention relates to a control unit or controller, and in particular relates to a control unit for use in a liquid ejecting apparatus.

BACKGROUND ART

A tank containing a liquid and a liquid ejecting apparatus in which the tank can be filled with the liquid are already well known. Such a liquid ejecting apparatus includes an ink jet printer, for example.

CITATION LIST

Patent Literature

PTL 1: JP-A-2012-111167

SUMMARY OF INVENTION

Technical Problem

When filling a liquid ejecting apparatus with a liquid, there is a possibility that an ink of a wrong color may be injected by mistake. However, PTL 1 has not anticipated such a case.

The present invention is made in consideration of the problem, and an object thereof is to provide a plan to deal with when a tank is filled with an ink of a wrong color by mistake, and to improve a user's convenience.

Solution to Problem

According to an aspect of the invention, there is provided a control unit for use in a liquid ejecting apparatus including multiple tanks containing respectively different liquids, the tanks storing an amount of liquid. Multiple storage materials, such as chip units, attachable to and detachable from the liquid ejecting apparatus. The control unit, when the storage material is to be mounted on the liquid ejecting apparatus, but is not mounted on a predetermined place, displays a fact of erroneous mounting and a first option about whether or not the liquid is injected to the tank after checking the erroneous mounting, and when a negative answer for the first option is input, displays a second option about whether or not the wrong liquid is injected into the tank.

Other features of the invention will be apparent from the specification and the accompanying drawings.

BRIEF DESCRIPTION OF DRAWINGS

FIG. 6 is an explanatory schematic view for explaining a management example of a remaining amount of an ink.

FIG. 10 is an explanatory schematic view for explaining a process when a used chip unit 180 is mounted.

FIG. 11 is an explanatory schematic view for explaining a process when a read-write error has occurred in a chip unit 180.

DESCRIPTION OF EMBODIMENTS

At least the following matters will be apparent from the specification and the accompanying drawings.

There is provided a control unit for use in a liquid ejecting apparatus including multiple tanks containing respectively different liquids, the tanks storing an amount of liquid. Multiple storage materials attachable to and detachable from the liquid ejecting apparatus. The control unit, when the storage material is to be mounted on the liquid ejecting apparatus, but is not mounted on a predetermined place, displays a fact of erroneous mounting and a first option about whether or not the liquid is injected to the tank after checking the erroneous mounting, and when a negative answer for the first option is input, displays a second option about whether or not the wrong liquid is injected into the tank.

According to such a display control unit, it is possible to improve a user's convenience.

In addition, when a positive answer for the second option is input, the controller may perform a display prompting to contact a manufacturer of the liquid ejecting apparatus.

In such a case, it is possible to further improve the user's convenience.

Configuration Example of Printer 100

Figure 1:
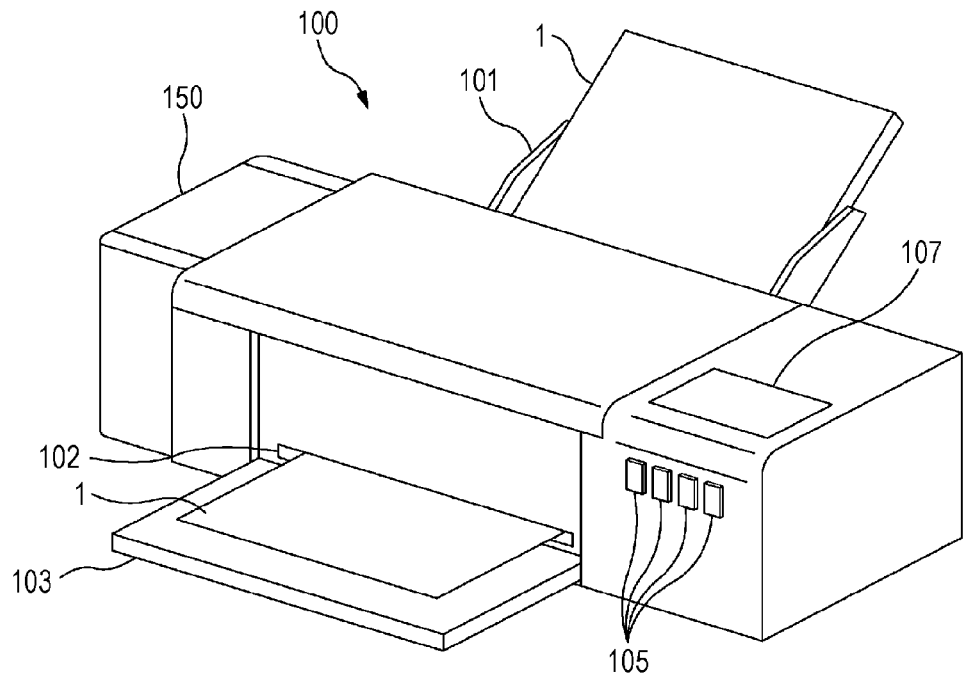
FIG. 1 is a schematic view illustrating an external configuration example of a printer 100.

FIG. 1 is a schematic view illustrating an external configuration example of an ink jet printer 100 (hereinafter, referred to as a printer 100) as an example of a liquid ejecting apparatus. The printer 100 has an external shape of a substantially box shape. A front surface cover 103 is disposed in approximately the center of the front surface, and a sheet feed tray 101 for setting a printing sheet 1, as an example of a medium, is disposed in the rear surface side. In addition, multiple operation buttons 105 are disposed next to the front surface cover 103 in the front surface side of the printer 100, and additionally a display panel 107 for displaying various information items is disposed next to the operation buttons 105 in the upper surface side of the printer 100, respectively. The front surface cover 103 is pivotally supported at the lower end side. If the upper end side is pulled forward, an elongated sheet discharge port 102 for discharging the printing sheet 1 appears. If the printing sheet 1 is set on the sheet feed tray 101 and the operation buttons 105 are operated, the printing sheet 1 is fed from the sheet feed tray 101. Then, after inside the printer 100, an ink (as an example of a liquid) is ejected on the surface of the printing sheet 1 by an ejecting head 112 (refer to FIG. 2) (which is an example of a head) to form an image. Thereafter, the printing sheet 1 is discharged from the sheet discharge port 102.

In addition, a tank case 150 having a box shape is disposed in the side surface of the printer 100. Multiple tanks 151 (refer to FIG. 2) for containing the ink are disposed inside the tank case 150 (to be described later in detail). The ink used for printing is supplied from the tanks 151 to the ejecting head 112 via an ink tube 117 (refer to FIG. 2, that is, a conduit). The tanks 151 are not attachable to and detachable from the printer 100, unlike a general ink cartridge. Therefore, when filling the tanks with the ink, the ink is directly injected or introduced into the tanks 151 (by opening a lid 153 of the tanks 151). That is, unlike an ink cartridge, the tanks 151 can be refilled with the ink. By using the display panel 107 (displaying to prompt refilling of the ink), it is possible to determine whether or not it becomes necessary to fill the tanks with the ink, such as when the ink is all consumed. The lid 153 of the tanks 151 may be configured to enable the filling of the ink, and may be disposed on the upper side of the tanks 151.

Figure 2:
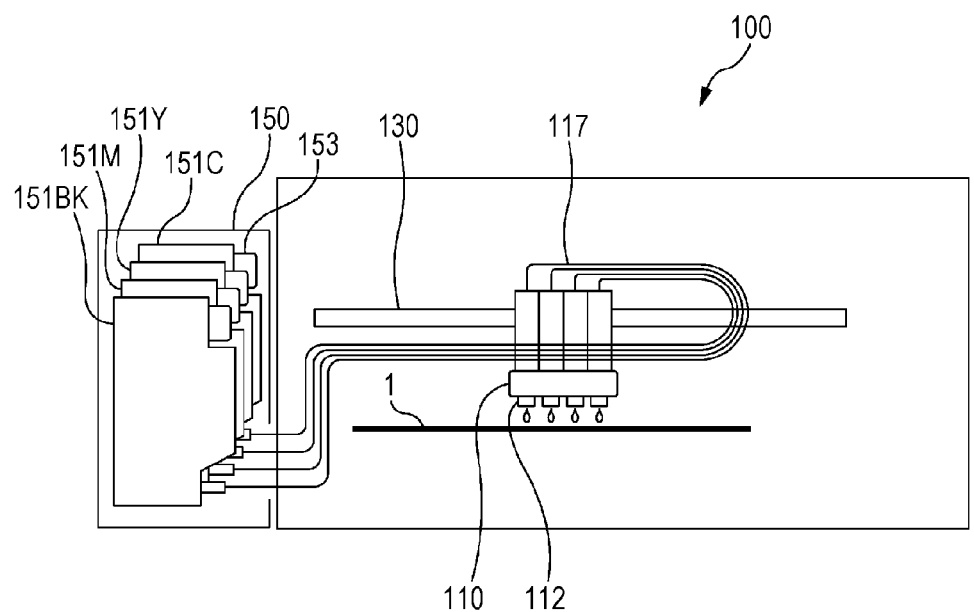
FIG. 2 is an explanatory schematic view illustrating an internal structure of a printer 100 according to an embodiment of the invention.

FIG. 2 is an explanatory schematic view illustrating an internal structure of the printer 100 according to the present embodiment. As illustrated, a carriage 110 relative to the printing sheet 1 disposed inside the printer 100. The ejecting head 112 which ejects the ink is disposed in the carriage 110. The printer 100 of the embodiment can print an image by using four colors of the ink such as a cyan color (hereinafter, referred to as C), a yellow color (hereinafter, referred to as Y), a magenta color (hereinafter, referred to as M) and a black color (hereinafter, referred to as BK). The ejecting head 112 is disposed for each color of the ink.

The carriage 110 is driven by a drive mechanism 114 (refer to FIG. 5), and repeatedly reciprocates relative to the printing sheet 1 while being guided by a guide rail 130. In addition, a sheet feed mechanism 116 (refer to FIG. 5) is disposed in the printer 100, and feeds the printing sheet 1 little by little according to the reciprocal movement of the carriage 110. Then, according to the reciprocal movement of the carriage 110 and the sheet feed movement of the printing sheet 1, the ejecting head 112 ejects the ink of the C color (hereinafter, referred to as a C ink), the ink of the Y color (hereinafter, referred to as a Y ink), the ink of the M color (hereinafter, referred to as an M ink), or the ink of BK color (hereinafter, referred to as a BK ink), thereby printing the image on the printing sheet 1.

The ink to be ejected from the ejecting head 112 is contained in the tanks 151 disposed inside the tank case 150. The printer 100 according to the embodiment uses four colors of the ink, such as the C ink, the Y ink, the M ink and the BK ink. Thus, in the case of the tanks 151, four tanks 151 are disposed in the tank case 150, one for each color of ink. For instance, the tanks 150 include a tank 151C for the C ink, a tank 151Y for the Y ink, a tank 151M for the M ink and a tank 151BK for the BK ink. The ink inside the tanks 151 is supplied to the ejecting head 112 via the ink tubes 117, one ink tube for each color of the ink.

Figure 3:
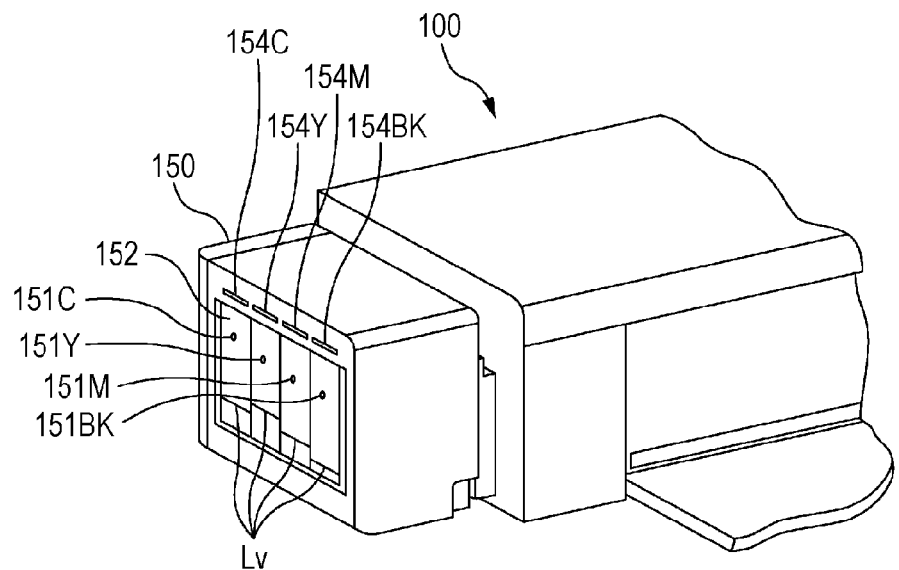
FIG. 3 is an explanatory schematic view illustrating a tank case 150 according to an embodiment.

FIG. 3 is an explanatory schematic view illustrating the tank case 150 according to the embodiment. As illustrated, a large checking window (opening) 152 is formed in the side surface of the tank case 150 so that the tank 151C for the C ink, the tank 151Y for the Y ink, the tank 151M for the M ink and the tank 151BK for the BK ink which are contained inside the tank case 150 are respectively visible. In addition, the respective tanks 151 are formed of transparent or semi-transparent resin materials. Therefore, it is possible to visually check positions of a liquid level Lv of the ink remaining in the respective tanks 151 (that is, the remaining amount of the ink).

In addition, a chip unit mounting unit 154 for mounting a chip unit 180, as an example of a storage material which can read and write, is disposed in the upper side of the respective tanks 151 of the tank case 150. That is, the chip unit 180 is attachable to and detachable from an ink jet printer main body. The printer 100 according to the embodiment uses four colors of the ink, such as the C ink, the Y ink, the M ink and the BK ink. Thus, as the chip unit 180, there are provided four chip units 180, a chip unit 180 for the C ink, a chip unit 180 for the Y color, a chip unit 180 for the M color and a chip unit 180 for the BK color, i.e., one chip unit for each color of the ink. Furthermore, as the chip unit mounting unit 154, there are provided four chip unit mounting units 154, such as a chip unit mounting unit 154C for the C ink, a chip unit mounting unit 154Y for the Y ink, a chip unit mounting unit 154M for the M ink and a chip unit mounting unit 154BK for the BK ink, i.e., one chip unit for each color of the ink.

Figure 5:
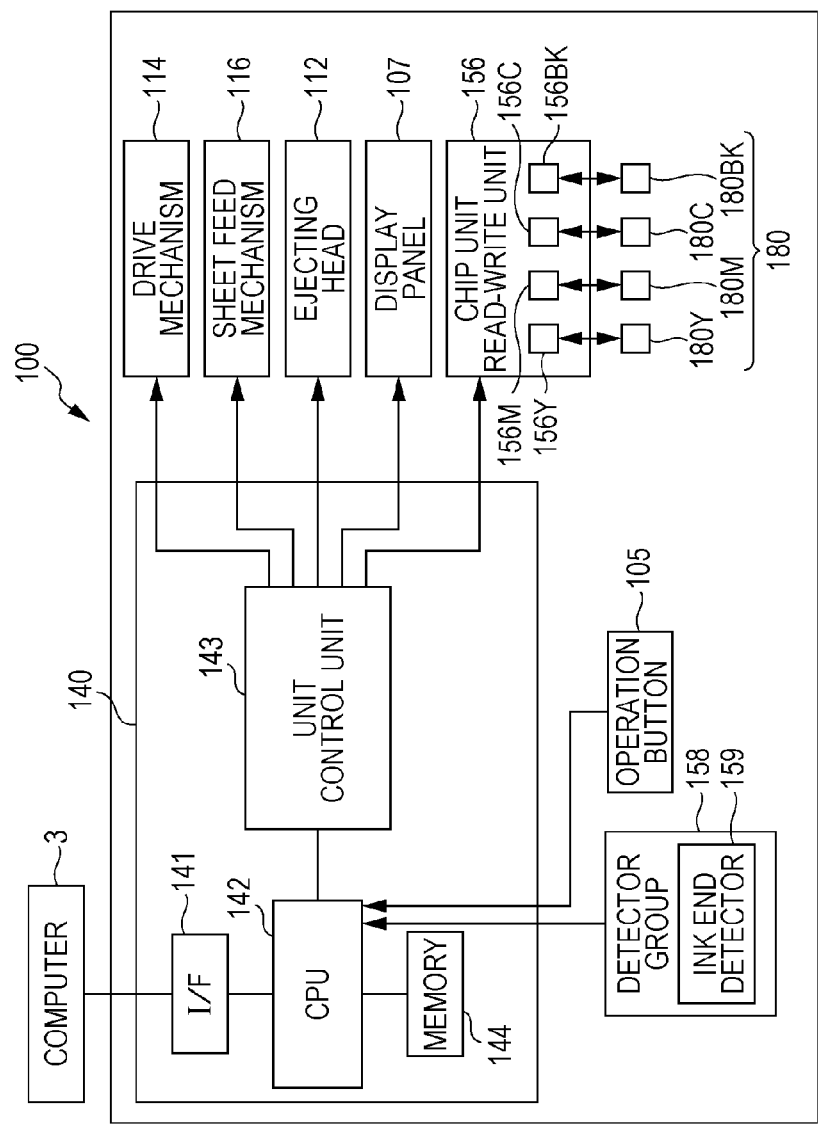
FIG. 5 is a schematic view illustrating an electrical configuration example of a printer 100 according to an embodiment.

Then, when the chip unit 180 is mounted on the chip unit mounting unit 154, data communication is performed between a chip unit read-write unit 156 provided in the chip unit mounting unit 154 (in the embodiment, as the chip unit read-write unit 156, there are provided a chip unit read-write unit 156C for the C ink, a chip unit read-write unit 156Y for the Y ink, a chip unit read-write unit 156M for the M ink, and a chip unit read-write unit 156BK for the BK ink, for each color of the ink refer to FIG. 5) and the chip unit 180. Color information of the ink, type information of the ink and capacity information of the ink are read from the chip unit 180 to the ink jet printer main body. In addition, ink amount information of the tanks 151 is to be written from the ink jet printer main body to the chip unit 180.

Figure 4:
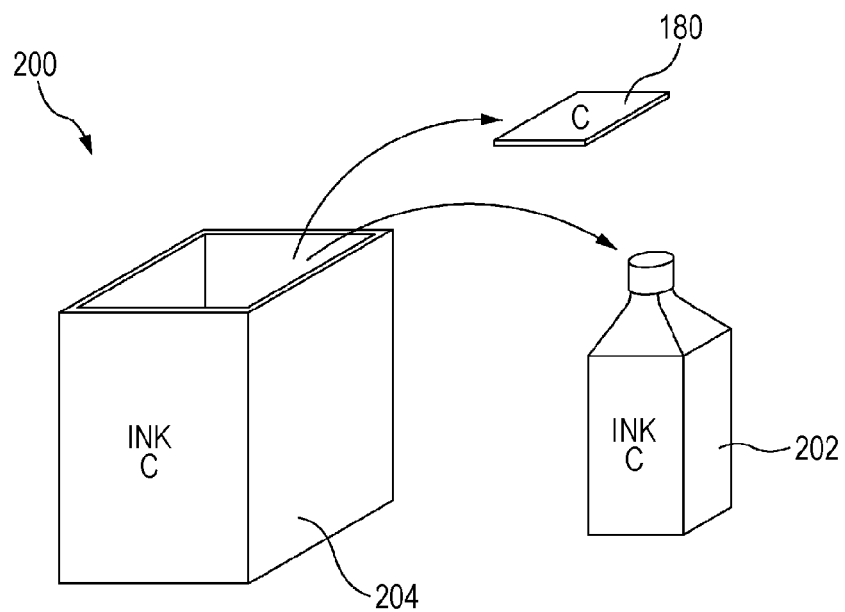
FIG. 4 is an explanatory schematic view for explaining a sale form of an ink for filling 200.

FIG. 4 is an explanatory schematic view for explaining a "sale form" of an ink for filling 200. As described above, it is necessary to fill the tank 151 with the ink after the ink runs out inside the tank 151. Shops, such as distributors, sell the ink for filling 200 to users in a form where an ink container for filling 202, i.e., a container having the ink used to fill or refill a tank, is bundled with a package 204 and an associated chip unit 180 i.e., a package that contains the container 202 and a chip unit 180 associated with the container 202 and the particular color of ink contained within the container 202. In the printer 100 according to the embodiment, even when purchasing the printer 100, the tank 151 is empty. Accordingly, it is necessary to fill the tank 151 with the ink after separately buying the ink for filling 200. The chip unit 180 is included in the same package with the ink container for filling 202, and make a set, with the ink container for filling 202, for a particular color and type of ink to be filled or refilling in a given tank 151. The chip unit 180 has a chip piece for storage and a holding portion for holding the chip piece. However, without being limited to the embodiment, the chip piece and the holding portion may be integral or only the chip piece may be bundled with the ink container for filling 202 when being sold.

To fill a tank, a user first mounts the bundled chip unit 180 on the chip unit mounting unit 154 during the ink filling (in a case where the separate (old) chip unit 180 is mounted on the chip unit mounting unit 154, the user removes it and mounts the bundled chip unit 180). Then, after completing the mounting of the chip unit 180, the user injects or introduces the ink to the tank 151 from the ink container for filling 202 through the lid 153 (see FIG. 2). When injecting the ink to the tank 151, the ink of the ink container for filling 202 is all injected at once. These matters are described in an operation manual of the printer 100 or the ink for filling 200.

FIG. 4 illustrates only the ink for filling 200 according to the C ink, but the ink for filling 200 of the other colors has the same configuration.

FIG. 5 is a schematic view illustrating an electrical configuration example of the printer 100 according to the embodiment.

The printer 100 receives printing data from a computer 3, which is an external device that causes a controller 140 to control the above-described respective units (the drive mechanism 114, the sheet feed mechanism 116 and the ejecting head 112). The controller 140 controls the respective units and prints the image on the sheet, based on the printing data received from the computer 3. The conditions inside the printer 100 are monitored by a detector group 158, and the detector group 158 outputs the detected result to the controller 140. The controller 140 controls the respective units based on the detected result output from the detector group 158. The computer 3 may not be provided in an alternate embodiment. The printing data may be obtained by mounting a storage medium that saves the printing data on the printer 100, or scanned printing data may be obtained through the connection to a scanner.

In the printer 100 according to the embodiment, as one of the detector group 158, an ink end detector 159, as an example of a detector physically detecting that there is no ink inside the tank 151, is disposed for each of four tanks 151. In the embodiment, the ink end detector 159 physically detects that there is no ink inside the tank 151 by determining the presence or absence of the ink inside the ink tube 117 by means of pressure detection, electric resistance detection, photo detection, and detection using a difference in reflection through a prism. The term "there is no ink inside the tank 151" is not limited to the fact that there is absolutely no ink inside the tank 151, but is a concept including that the ink remains a little inside the tank 151 (Thus, for example, the ink end detector 159 may be disposed at the bottom portion of the tank 151 instead of the ink tube 117).

The controller 140 is a control unit (control part) for controlling the printer 100. The controller 140 has an interface unit 141, a CPU 142, a memory 144 and a unit control unit 143. The interface unit 141 transmits and receives the data between the computer 3 which is an external device and the printer 100. The CPU 142 is an arithmetic processing device for controlling the entire ink jet printer. The memory 144 is intended to ensure a region for storing programs of the CPU 142 or a working region, and has a memory element such as an RAM which is a volatile memory and an EEPROM which is a non-volatile memory. According to the programs stored in the memory 144, the CPU 142 controls the respective units via the unit control unit 143.

In addition, the controller 140 controls the chip unit read-write unit 156, reads the data from the chip unit 180, and writes the data on the chip unit 180. In addition, the controller 140 presents the information to a user by controlling the display panel 107, and receives an instruction from the user via the operation buttons 105 and the display panel 107, i.e., the controller 140 receives inputs based upon instructions received through the operation buttons 105 and the display panel 107.

Management Example of Remaining Amount of Ink

As described above, in the printer 100 according to the embodiment, it is necessary to fill the tank 151 with the ink if the ink inside the tank 151 runs out. Then, the fact that it is necessary to fill the tank with the ink is configured to be displayed on the display panel 107. In order to achieve this configuration, it is necessary to manage the remaining amount of the ink inside the tank 151. Herein, a management example of the remaining amount of the ink will be described with reference to FIG. 6. The management of the remaining amount of the ink is performed for each of four colors of the ink, but the method thereof is the same as each other. Thus, herein, the C ink will be mainly described.

In addition, an operation described below is mainly performed by the controller 140. In particular, in the embodiment, the operation is achieved in such a manner that the CPU 142 processes the program stored in the memory 144. Then, the program is configured to have codes for performing various operations described below.

Preparation Before Printing

A user who purchases the printer 100 and the ink for filling 200 first opens the package 204 of the ink for filling 200, takes out the ink container for filling 202 and the chip unit 180, and as described above, first mounts the chip unit 180 on the chip unit mounting unit 154. Then, the controller 140 controls the chip unit read-write unit 156 to perform the following operation.

The controller 140 reads color information from the chip unit 180, and compares it with the preset color information in the memory 144. The preset color information is the color information of the ink or type information of the ink. For example, in a case where the chip unit 180 is mounted on the chip unit mounting unit 154C for the C ink, it is checked that the color information of the ink indicates the C ink.

In addition, as the type information of the ink, for example, it is checked which ink is suitable for the printer 100 between a water-based ink and a solvent-based ink.

Then, if both checking results are favorable, the controller 140 further reads the other information from the chip unit 180. The other information includes capacity information of the ink contained in the ink container for filling 202, or expiry date of the ink. The controller 140, after reading the information from the chip unit 180, updates a consumed amount saved in the memory 144 (to be described later) to zero, or updates the capacity information of the ink. In the embodiment, for convenience of the description, the ink of 1,000 grams is contained in the ink container for filling 202, and the capacity indicated by the capacity information of the ink (referred to as the ink capacity) is 1,000 grams.

Then, after completing the mounting of the chip unit 180, if the ink of 1,000 grams is injected from the ink container for filling 202 to the tank 151, the printer 100 is ready to print.

Method of Estimating Ink Used Amount

In the printer 100 according to the embodiment, an ink used amount (consumed amount by the printer 100) is not measured, but is estimated by known methods as follows.

That is, the controller 140 analyzes the printing data described above, and counts the number of dots. Then, the ink used amount per dot and the counted number are multiplied to estimate the ink used amount. Alternatively, the number of drive times and injection weight when ejecting the ink may be multiplied.

Here, of course, tolerance is present in the ink used amount per dot. For example, depending on the individual difference of the printer 100, the ink used amount per dot varies minutely. In addition, even in the same printer 100, depending on the environment where the printer 100 is placed, the ink used amount per dot varies minutely. For example, in the high temperature and low humidity environment, there is a tendency that the ink used amount is increased. On the contrary, in the low temperature and high humidity environment, there is a tendency that the ink used amount is decreased. Therefore, in the embodiment, the above-described multiplication is performed by using the maximum ink used amount (per dot) in the tolerance range. For example, if the tolerance "a" is 6 percent, the maximum ink used amount is Qmax grams in the tolerance range, and the minimum ink used amount is Qmin grams, Qmax/Qmin−1=0.06 is established. The actual ink used amount varies between Qmin and Qmax, but the ink used amount is estimated by using Qmax.

With regard to the use of the ink (for example, maintenance such as flushing and cleaning) other than the use of the ink for forming the image, it is similarly estimated how much the ink is used. Then, even at that time, the estimation is performed by using the maximum ink used amount in the tolerance range. Therefore, the ink used amount is the sum of the ink amount used for forming the image and the ink amount used for the maintenance.

In addition, herein, for convenience, a virtual printer consuming the largest amount of the ink in the tolerance range (whose ink consumption speed is high) is referred to as a Max printer, and a printer consuming the smallest amount of the ink (whose ink consumption speed is low) is referred to as a Min printer.

Operation when Consumption Counter Reaches 100 Percent

If the printing is performed in the printer 100, the ink is gradually consumed. Then, the controller 140 continues to add the above-described estimated ink used amount accordingly (the estimated ink amount which is added and accumulated is referred to as the consumed amount).

In the embodiment, each time the consumed amount is changed, the consumed amount is saved and managed in the above-described memory 144. In addition, the controller 140 performs the calculation of the consumed amount/the ink capacity*100, and manages the ink used amount by using the percentage. In the embodiment, this is referred to as a consumption counter. The consumption counter is written on the chip unit 180 each time the calculation is performed. The consumption counter of the chip unit 180 is zero percent when being mounted, and continues to increase according to the use of the ink and writing on the chip unit 180.

If the printing is repeated, the consumed amount eventually reaches the ink capacity (that is, 1,000 grams/in other words, the consumption counter reaches 100 percent). Then, at that time, the controller 140 performs the following process.

Figure 7:
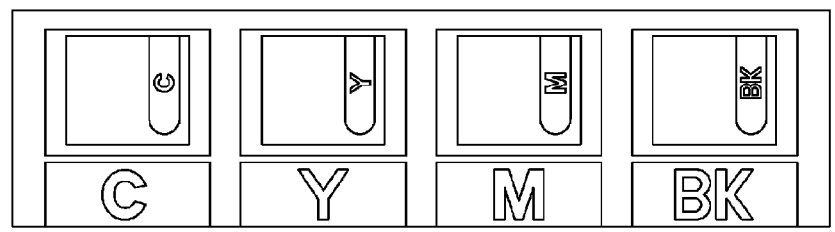
FIG. 7 is a schematic view illustrating an example of marks displayed on a display panel 107.
Figure 8:
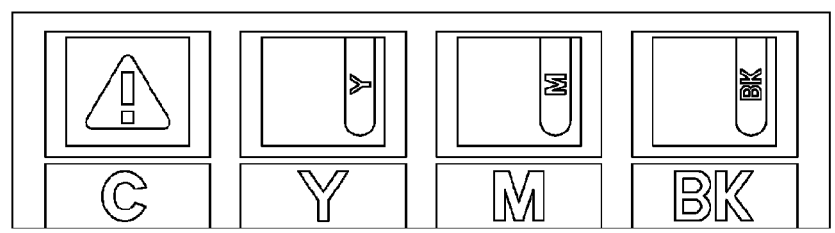
FIG. 8 is a schematic view illustrating an example of marks displayed on a display panel 107.

That is, the controller 140 performs an operation to provide a display on the display panel 107 for indicating the necessity of refilling the tank 151. Specifically, the controller 140 displays a message of "It is time to replace the chip unit. Please replace the chip unit." This message is referred to, for convenience, as a "replacement time message" and is associated with the section B1 in FIG. 6 (that is, the cell in the row B of the second line, and the row B in the first column of the first line)), and a mark (refer to FIG. 8) in which an exclamation mark is written in a yellow triangle drawn on a white background. In FIG. 8, if the above-described mark is shown in "C" only, it means that it is necessary to refill the tank with the C ink and thus it is not necessary to refill the tank with the other inks. In addition, in the normal (that is, before the consumption counter reaches 100 percent) display on the display panel 107, a message of "printable" (refer to the section A1 in FIG. 6) and the mark illustrated in FIG. 7 are displayed. The above-described replacement time message and the mark in FIG. 8 are changed from here.

Here, a change from FIG. 7 to FIG. 8 will be further described by way of an example of the mark of the C ink (the same is applied to the other colors). As illustrated in FIGS. 7 and 8, the mark includes an upper side rectangular portion and a lower side rectangular portion. In the center of the lower side rectangular portion, the display showing the cyan color, that is, "C" is written by using the color other than the cyan color (in the embodiment, white) in the background painted in the cyan color. On the other hand, as illustrated in FIG. 7, in the right end portion of the upper side rectangular portion, a vertically long strip-shaped portion painted in the cyan color is present, and inside the strip-shaped portion, "C" rotated by 90 degrees is written by using the color other than the cyan color (in the embodiment, white) in the background painted in the cyan color.

Then, in the change from FIG. 7 to FIG. 8, as is apparent from FIG. 8, the lower side rectangular portion is not changed, but the upper side rectangular portion is changed. That is, the upper side rectangular portion is changed from a display showing the color (cyan color) to a display not showing the color (cyan color) (that is, a portion of the mark is changed to the display not showing the color).

In the change from the display showing the color (cyan color) to the display not showing the color (cyan color), there may be some cases such as a case where only the color in the background disappears, a case where only "C" disappears and a case where both of them disappear (this case is adapted to the embodiment). In addition, as a modification example of the upper side rectangular portion, the strip-shaped portion may be a drop-shaped portion, and the relevant portion may be painted in the cyan color (In addition, "C" may not be written). A diagram or writing for giving an image indicating that the ink is running out may be used, or a diagram or writing for giving an image indicating that it is necessary to replace the chip unit 180 may be used.

In addition, the controller 140, when the consumption counter reaches 100 percent, stops writing the consumption counter of the tank 151 on the chip unit 180 (More specifically, if the consumption counter reaches 100 percent, the controller 140 performs the last writing on the chip unit 180, performs the writing of an ineffective chip flag, and then stops the subsequent writing. Refer to sections B2, C2 and D2 in FIG. 6). That is, it is assumed that a state where the consumption counter stored by the chip unit 180 is updated is transited or transitioned to a state where the consumption counter is not updated.

The controller 140 according to the embodiment, in order to share the above-described ink amount with the memory 144 inside the ink jet printer main body and the chip unit 180 outside the ink jet printer main body, each time the consumed amount is changed, not only performs the writing of the ink amount information on the memory 144 but also performs the writing of the consumption counter on the chip unit 180 (refer to the section A2 in FIG. 6). However, the interval in the writing on the chip unit 180 is longer than the interval in the writing on the memory 144, for example, each time the consumed amount is changed by two grams, the writing on the chip unit 180 is performed. That is, the consumption counter stored by the chip unit 180 is to be updated. However, when the consumption counter reaches 100 percent, the written information on the chip unit 180 exceeds 100 percent. Accordingly, it is no longer necessary to write the information, thereby stopping the writing. On the other hand, the writing on the memory 144 is continued.

In the embodiment, as described above, consumption counter information indicating the ink used amount (consumed amount) by using the percentage is to be written on the chip unit 180, as the ink amount in the tank 151 (equivalent to the liquid amount in the tank in claims). On the other hand, instead of the consumption counter information, the consumed amount information is to be written on the memory 144, as the ink amount (equivalent to the liquid amount stored by the control unit in claims). That is, in the embodiment, as the ink amount relating to the chip unit 180, the consumption counter is exemplified, but without being limited to this, the consumed amount, the estimated remaining amount of the ink obtained by subtracting the consumed amount from the ink capacity, or one indicating the estimated remaining amount of the ink by using the percentage may be used. In addition, as the ink amount relating to the memory 144, the consumed amount is exemplified, but without being limited to this, the estimated remaining amount of the ink, or one indicating the consumed amount or the estimated remaining amount of the ink by using the percentage may be used.

Incidentally, when performing the printing (in other words, when the ink is ejected by the ejecting head 112), the consumption counter normally reaches 100 percent (that is, the consumed amount reaches the ink capacity), but even in such a state, the printing process is continued (refer to the sections A3 and B3 in FIG. 6). That is, although the consumption counter reaches 100 percent, the printing process which is performed is not stopped.

In addition, as described above, the display indicating the necessity of refilling the tank 151 with the ink appears on the display panel 107, a user performs the refilling work of the ink. In other words, the user first removes the chip unit 180 from the chip unit mounting unit 154, and mounts a new chip unit 180 bundled with a new ink container for filling 202 on the chip unit mounting unit 154. After completing the mounting of the chip unit 180, the user injects or introduces the ink from the ink container for filling 202 to the tank 151. Then, even when performing such refilling work, the printing process is similarly continued.

The reason will be described. As described above, in the embodiment, the ink used amount is estimated by using Qmax which is the maximum ink used amount within the tolerance range. Since the possibility of the maximum ink amount being used is low, in many cases, the consumed amount is changed exceeding an actually accumulated ink used amount. Therefore, even when the consumed amount reaches the ink capacity (even when the consumption count reaches 100 percent), the actually accumulated ink used amount does not reach the ink capacity, and thus the ink still remains.

To illustrate a specific numerical example, if the printer 100 is the above-described Max printer, when the consumed amount reaches the ink capacity (1,000 grams), the actually accumulated ink used amount also reaches the ink capacity (1,000 grams), and the remaining ink amount is zero. On the other hand, if the printer 100 is the above-described Min printer, when the consumed amount reaches the ink capacity (1,000 grams), the actually accumulated ink used amount is 943 grams (=1,000 1(1+0.06)), and the remaining ink amount is 57 grams. Therefore, the ink remains at least in the range of equal to or larger than 0 and equal to or smaller than 57.

In addition, in the printer 100 according to the embodiment, unlike an ink cartridge type printer in which a chip unit is integrated with an ink cartridge, the chip unit 180 is not integrated with the tank 151. Thus, even if the chip unit 180 is removed, the tank 151 still remains unchanged in the main body side. That is, in the printer 100 according to the embodiment, when actually performing the refilling work, there is no possibility that the tank 151 may be detached from the ink jet printer main body.

As described above, when the consumption counter reaches 100 percent, and when actually performing the refilling work, the tank 151 where the ink remains is still present in the main body side. Thus, the printing process which is performed is not stopped, but the printing process is continued.

In the above description, a point that the printer 100 does not stop the operation, when the consumption counter reaches 100 percent, even if the chip unit 180 is removed, has been described (refer to the section B4 in FIG. 6). On the other hand, the printer 100 is configured to stop the operation, when the chip unit 180 is removed before the consumption counter reaches 100 percent (when performing the printing, the stoppage of the printing process. refer to the section A4 in FIG. 6). In this case, if the tank is filled with the ink before the consumed amount reaches 100 percent, there is a possibility that the ink may spill out from the tank 151. Therefore, the refilling work of the ink need not be performed. Accordingly, since it is not the time for the chip unit 180 to be removed, the stoppage of the operation is performed in order to warn of this fact. The controller 140, according to the embodiment, stops the printing process, and performs the display to prompt the remounting of the chip unit 180 on the display panel 107. Specifically, the controller 140 displays a message of "No chip unit. Please mount the chip unit." and a mark in which an X character is written inside a red circle drawn on a white background (refer to FIG. 9).

Operation when Consumption Counter Reaches 106 (100+Tolerance a) Percent

As described above, if the consumption counter reaches 100 percent, the display indicating the necessity of refilling the tank 151 with the ink appears on the display panel 107. However, in some cases, a user may not immediately perform the refilling work of the ink. Then, in such a state, if the printing is repeatedly performed, the consumption counter eventually reaches 106 (100+tolerance a) percent. In this case, the controller 140 performs the following process.

That is, the controller 140 performs a display to warn of the stoppage of the printing on the display panel 107. Specifically, a message of "If the chip unit is not replaced, the printing will be paused." (for convenience, referred to as a printing stop warning message. Refer to the section C1 in FIG. 6) is displayed, and the above-described mark (refer to FIG. 8) in which the exclamation mark is written in the yellow triangle drawn on the white background is changed from a lighting state to a blinking state. Then, even in such a state, the printing process is continued (refer to the section C3 in FIG. 6).

In addition, as a result that the display to warn of the stoppage of the printing appears on the display panel 107, even if a user performs the above-described refilling work of the ink, the printing process is similarly continued (refer to the section C4 in FIG. 6).

The time when the consumption counter reaches 106 (100+tolerance a) percent is the time when the actually accumulated ink used amount reaches the ink capacity (1,000 grams) and the remaining ink amount is zero, even if the printer 100 is the Min printer. Therefore, when the consumption counter reaches 106 (100+tolerance a) percent, it seems necessary to stop the printing without warning of the stoppage of the printing. However, for the following reason (considering that the following situation may occur), such a configuration is not adapted.

The situation which may occur will be described. If the ink jet printer is the Min printer, when the consumption counter reaches 100 percent, the ink remains and the amount thereof is 57 grams (that is, the actually accumulated ink used amount is 943 grams). Then, in this case, if a user immediately performs the refilling work of the ink based on the display indicating the necessity of refilling the tank 151 with the ink, the actual ink amount is 1,057 grams.

The controller 140 cannot recognize that the actual ink amount is 1,057 grams, and calculates the consumption counter based on the ink amount indicated by the ink capacity information of the newly attached chip unit 180 (that is, 1,000 grams). Therefore, when the actually accumulated ink used amount is 943 grams, the consumption counter reaches 100 percent, and the remaining ink amount at this time is 114 grams (=1,056−943=57*2). In this manner, each time a user performs the refilling work of the ink, a phenomenon occurs in which the remaining ink of 57 grams is accumulated in the tank 151.

Then, in such a state, if the printing is stopped when the consumption counter reaches 106 (100+tolerance a) percent, the following disadvantage may occur.

For example, after the refilling work is performed once, when the consumption counter reaches 100 percent, the ink of 114 grams (=(1,000−943)*1+1,000−943) is present in the tank 151. Then, in this case (that is, in spite that a considerable amount of the ink still remains), the display indicating the necessity of refilling the tank 151 with the ink appears. Then, in this case, unlike up to now, at this time, a user may not perform the refilling of the ink (As described above, the user can visually check through the checking window (opening) 152).

Then, a short time later after the refilling work of the ink is not performed, the consumption counter reaches 106 (100+tolerance a) percent, and the printing is stopped. In this case, it can be expected that most users perform the refilling work of the ink by recognizing that the printing has been stopped. Then, the ink of 57 grams (=(1,000−943)*1+1,000−1,000) is present in the tank 151 at this time. If the tank is refilled with the ink, the actual ink amount is 1,057 grams (=(1,000−943)*1+(1,000−1,000)+1,000).

Then, next, when the consumption counter reaches 106 (100+tolerance a) percent and the printing is stopped, a user performs the refilling work again, but as before, the ink of 57 grams (=(1,000−943)*1+(1,000−1,000)+1,000−1,000) is present in the tank 151 at this time. That is, the ink of 57 grams (=(1,000−943)*1) which is accumulated at the beginning is not reduced even after repeated subsequent refilling works numerous times. Thus, the user is to continue the refilling work in a state where the ink remains.

In contrast, in the embodiment, when the consumption counter reaches 106 (100+tolerance a) percent, the printing is not stopped, but a warning of the stoppage of the printing is presented on the display panel 107. Therefore, if a user can visually confirm that the ink remains, the user can postpone the performance time for the refilling work a little at the user's own discretion while maintaining the performance of the printing process. In this manner, it is possible to reduce the ink of 57 grams (=(1,000−943)*1) which is accumulated at the beginning.

In a state where the refilling is not performed even once, when the consumption counter reaches 106 (100+tolerance a) percent, the ink will not remain eventually. Therefore, in such a state, it seems inconvenient to warn of the stoppage of the printing. However, in the embodiment, in this case, the above-described physical ink end detector 159 is adapted to work (adapted to eliminate the inconvenience).

That is, in the embodiment, when the ink end detector 159 detects the absence of the ink inside the tank 151 and the controller 140 receives the detected result, regardless of a value of the consumption counter (in any value of the consumption counter), the printing process is to be stopped. Then, the controller 140 displays the absence of the ink and the necessity of the refilling on the display panel 107. Specifically, a message of "Remaining ink amount is equal to or less than the threshold value. Please refill the tank with the ink. Please press the OK button after refilling of the ink" is displayed on the display panel 107.

Operation when Consumption Counter Reaches 112 (100+Tolerance 2a) Percent

As described above, even when the consumption counter reaches 106 (100+tolerance a) percent, a user can postpone the performance time for the refilling work a little at the user's own discretion, while maintaining the performance of the printing process. Then, in such a state, if the printing is repeatedly performed, the consumption counter eventually reaches 112 (100+tolerance 2a) percent. Then, in this case, the controller 140 performs the following process.

That is, the controller 140 stops the printing process (refer to the section D3 in FIG. 6), and displays on the display panel 107 the fact that the replacement time for the chip unit 180 is exceeded. Specifically, the controller displays a message of "The replacement time for the chip unit is exceeded. Please replace the chip unit." (for convenience, referred to as a "replacement time excess message", refer to the section D1 in FIG. 6) and a mark in which an X character is written inside a red circle drawn on a white background (refer to FIG. 9).

In the embodiment, the time when the printing is stopped is determined, based on a volume of the tank 151.

That is, in the embodiment, the volume of the tank 151 is the volume equivalent to the ink of 1,057 grams. Therefore, there is no possibility that more than the volume of the ink may be present in the tank 151. Therefore, no matter how the printer (Min printer) has the slow ink consumption speed within the tolerance range, when the consumption counter reaches 112 (100+tolerance 2a) percent, the tank 151 becomes empty.

In this manner, in the embodiment, even in any printer 100 from the Max printer to the Min printer, the time when the amount of the ink which is equivalent to the volume of the tank 151 is all used (ink amount) is set to the time to stop the printing (consumption counter). Even if the actual ink amount more than the consumption counter (for example, 150 percent) is set to the consumption counter for the time when the printing is stopped, the ink amount more than the volume cannot be present. Thus, this is meaningless. From such a point of view, in any printer 100 from the max printer to the Min printer, it is preferable that the ink amount corresponding to the consumption counter where the ink amount equivalent to the volume of the tank 151 is all used be set to the time to stop the printing. The operation described above is performed when the physical ink end detector does not detect the absence of the ink. When the physical ink end detector detects the absence of the ink, it is determined that the ink has ended, based on the detected result, and the operation of the printer 100 is stopped.

Modification Example

In the above-described embodiment, the volume of the tank 151 is set to the volume equivalent to the ink of 1,057 grams. That is, the volume of the tank 151 is set to a volume causing the tank 151 to be empty when the printer 100 is the Min printer and the consumption counter reaches 112 (100+ tolerance 2a) percent. However, without being limited thereto, for example, it may be a volume more than this.

In addition, in the above-described embodiment, the amount of the ink contained in the ink container for filling 202 is set to be exactly the same as the volume indicated by the ink capacity information stored in the chip unit 180 (both are 1,000 grams), but is not limited thereto. For example, the amount of the ink contained in the ink container for filling 202 may be a little more than the capacity.

Abnormality Process Example when Mounting Chip Unit 180

As described above, in the printer 100 according to the embodiment, when refilling the tank 151 with the ink (as a part of the works), the chip unit 180 is mounted on the chip unit mounting unit 154. However, in this case, there is a possibility that some abnormalities may occur. Herein, a process example of the controller 140 when the abnormality has occurred (referred to as an abnormality process) will be described with reference to FIGS. 10 to 12.

Figure 12:
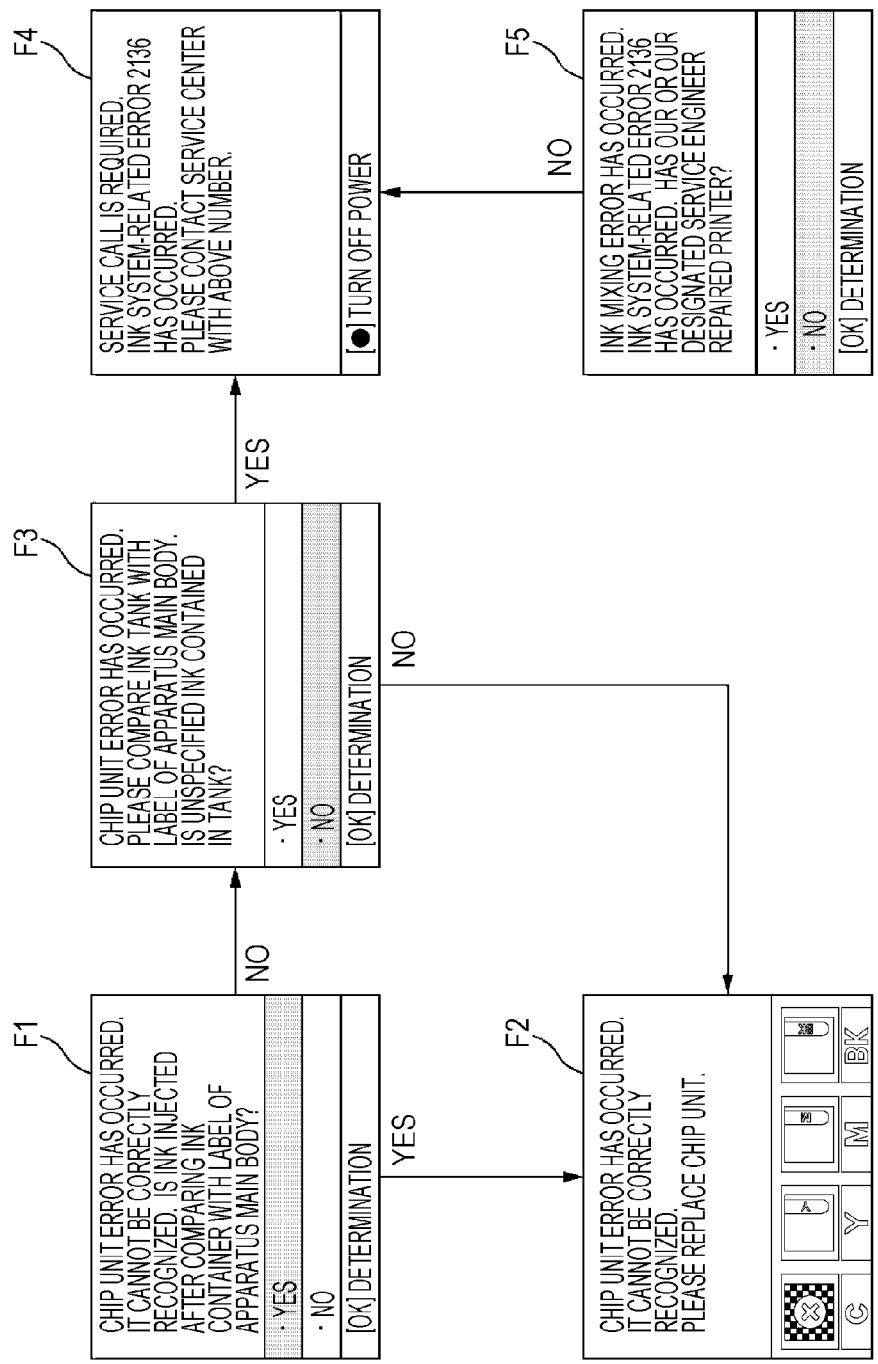
FIG. 12 is a schematic transition view representing a process when an incompatible chip unit 180 is mounted on a chip unit mounting unit 154, by using a transition of displays on a display panel 107.

FIG. 10 is an explanatory schematic view for explaining a process when the used chip unit 180 is mounted. FIG. 11 is an explanatory schematic view for explaining a process when a read-write error has occurred in the chip unit 180. FIG. 12 is a schematic transition view representing a process when an incompatible chip unit 180 is mounted on the chip unit mounting unit 154, by using a transition of displays on the display panel 107.

The abnormality process is performed for each of the chip units 180 corresponding to four colors, but each process thereof is the same as each other. Thus, herein, the chip unit 180 corresponding to the C ink will be mainly described.

In addition, the operation described below is mainly implemented by the controller 140. In particular, in the embodiment, the operation is implemented in such a manner that the CPU 142 processes the program stored in the memory 144. Then, the program is configured to have codes for performing various operations described below.

Process when Used Chip Unit 180 is Mounted

As described above, when the consumption counter reaches 100 percent, an ineffective chip flag is written on the chip unit 180, and thus the chip unit 180 becomes a used chip unit. Then, when performing the refilling work of the ink, the used chip unit 180, which is no longer useable, is removed from the chip unit mounting unit 154 for the replacement by a new chip unit 180, but sometimes the used chip unit is not properly disposed thereafter. Thus, in some cases, a user may mistakenly mount the used chip unit again. Then, in such a case, the controller 140 performs the following process.

The controller 140 performs different processes before and after the consumption counter reaches 100 percent. Therefore, herein, both cases will be separately described.

<Process Before Consumption Counter Reaches 100 Percent>

Before the consumption counter reaches 100 percent, the controller 140 reads the used chip unit 180, and when recognizing the ineffective chip flag, performs the following process.

That is, the controller 140 performs an operation to provide a display on the display panel 107 indicating that the chip unit 180 whose replacement time is exceeded (that is, used) is mounted thereon. Specifically, the controller displays a message of "The replacement time for the chip unit is exceeded. Please replace the chip unit." (for convenience, referred to as a replacement time excess message. Refer to the section A1 in FIG. 10) and a mark in which an X character is written inside a red circle drawn on a white background (refer to FIG. 9).

As described above, before the consumption counter reaches 100 percent, when the printing process is performed, if the chip unit 180 is removed, the controller 140 stops the printing process. Therefore, when mounting the used chip unit 180, the printing process is supposed to be stopped already (refer to the section A2 in FIG. 10).

<Process after Consumption Counter Reaches 100 Percent>

After the consumption counter reaches 100 percent, when a user performs the above-described refilling work of the ink based on the display on the display panel, the user first removes the chip unit 180 from the chip unit mounting unit 154, and mounts a new chip unit 180 bundled with a new ink container for filling 202 on the chip unit mounting unit 154. However, in some cases, the user may mount the used chip unit 180 instead of the new chip unit 180 by mistake. In such a case, the controller 140 reads the used chip unit 180, and when recognizing the ineffective chip flag, performs the following process.

The controller 140, when recognizing a new chip unit 180 (authentic chip unit 180) instead of the used chip unit 180 (when not recognizing the ineffective chip flag), erases the display on the display panel. For example, when the message of "It is time to replace the chip unit. Please replace the chip unit." (refer to the section B1 in FIG. 6) and the mark in which an exclamation mark is written in a yellow triangle drawn on a white background (refer to FIG. 8) are displayed (lighting), the controller 140 erases these. When the message of "If the chip unit is not replaced, the printing is paused." (refer to the section C1 in FIG. 6) and the mark in which the exclamation mark is written in the yellow triangle drawn on the white background (refer to FIG. 8) are displayed (blinking), the controller 140 erases these.

However, the controller 140, when recognizing the used chip unit 180 (ineffective chip flag), performs a process to maintain the display (not to erase the display) of these messages and marks (refer to the section B1 in FIG. 10). That is, when the message of "It is time to replace the chip unit. Please replace the chip unit." (refer to the section B1 in FIG. 6) and the mark in which the exclamation mark is written in the yellow triangle drawn on the white background (refer to FIG. 8) are displayed (lighting), the controller 140 maintains these. When the message of "If the chip unit is not replaced, the printing is paused." (refer to the section C1 in FIG. 6) and the mark in which the exclamation mark is written in the yellow triangle drawn on the white background (refer to FIG. 8) are displayed (blinking), the controller 140 maintains these.

Furthermore, the controller 140, when the printing process is performed, does not stop the printing process. That is, the printing process is also similarly maintained (refer to the section B2 in FIG. 10).

Figure 9:
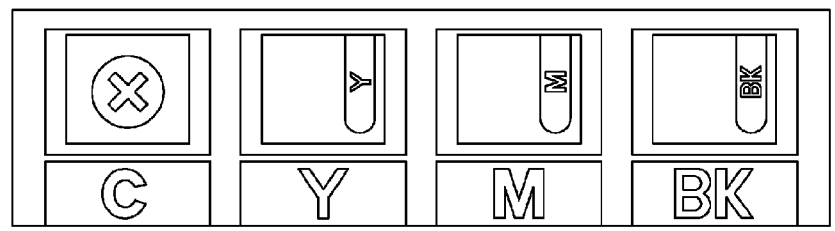
FIG. 9 is a schematic view illustrating an example of marks displayed on a display panel 107.

The reason for the above is as follows. That is, if the printing is stopped only by mounting the used chip unit 180, a user may suffer a large loss. In addition, the reason why the display which has been already shown is maintained (not just erased) without changing the message of "It is time to replace the chip unit. Please replace the chip unit." and the mark in FIG. 9 is because there is a high possibility that a user may be surprised (feel an impact) and stop the printing if the display is changed (It is expected that a user who becomes aware of no change in the display which has been already shown does not stop the printing and replace the used chip unit 180 with the authentic chip unit 180).

Process when Read-Write Error has Occurred in Chip Unit 180

When the chip unit 180 is mounted on the chip unit mounting unit 154, a read-write error (that is, a read-write failure) may occur. Then, in such a case, the controller 140 performs the following process.

The controller 140 performs different processes before and after the consumption counter reaches 100 percent. Therefore, herein, both cases will be separately described.

<Process Before Consumption Counter Reaches 100 Percent>

Before the consumption counter reaches 100 percent, the controller 140, when recognizing the read-write error, performs the following process.

That is, the controller 140 performs an operation to provide the display indicating that the read-write error has occurred on the display panel 107. Specifically, the controller displays a message of "A chip unit error has occurred. It cannot be correctly recognized. Please reset the chip unit or replace it." (for convenience, referred to as a chip unit error message. refer to the section A1 in FIG. 11) and a mark in which an X character is written inside a red circle drawn on a checkered pattern background (refer to FIG. 13).

The reason why the wording of the message includes "Please reset the chip unit or" is because in some cases, the read-write error temporarily occurs (for example, a case where trash interposed between the chip unit 180 and the chip unit mounting unit 154 causes the error), and thus the error can be corrected without any problem if the chip unit is reset. In addition, the reason why the checkered pattern is employed as the background is to emphasize that the read-write error occurs by changing the pattern of the background from a plain background.

As described above, before the consumption counter reaches 100 percent, when the printing process is performed, if the chip unit 180 is removed, the controller 140 stops the printing process. Therefore, when mounting the used chip unit 180, the printing process has been already stopped (refer to the section A2 in FIG. 11).

<Process after Consumption Counter Reaches 100 Percent>

After the consumption counter reaches 100 percent, when a user performs the above-described refilling of the ink, based on the display on the display panel, the user first removes the chip unit 180 from the chip unit mounting unit 154, and then mounts a new chip unit 180 bundled with a new ink container for filling 202 on the chip unit mounting unit 154. Then, in this case, the controller 140, when recognizing the read-write error, performs the following process.

The controller 140, when correctly recognizing a new chip unit 180 (when not recognizing the read-write error), erases the display on the display panel. For example, when the message of "It is time to replace the chip unit. Please replace the chip unit." (refer to the section B1 in FIG. 6) and the mark in which the exclamation mark is written in the yellow triangle drawn on the white background (refer to FIG. 8) are displayed (lighting), the controller 140 erases these. When the message of "If the chip unit is not replaced, the printing is paused." (refer to the section C1 in FIG. 6) and the mark in which the exclamation mark is written in the yellow triangle drawn on the white background (refer to FIG. 8) are displayed (blinking), the controller 140 erases these.

However, the controller 140, when recognizing the read-write error, performs an operation to provide the display in which the display of these messages and marks is minutely modified (refer to the section B1 in FIG. 11). That is, when the message of "It is time to replace the chip unit. Please replace the chip unit." (refer to the section B1 in FIG. 6) and the mark in which the exclamation mark is written in the yellow triangle drawn on the white background (refer to FIG. 8) are displayed (lighting), the controller 140 performs an operation to display (lights) a minutely modified message of "It is the time to replace the chip unit. Please reset or replace it." and a minutely modified mark in which an exclamation mark is written in a yellow triangle drawn on a checkered pattern background (refer to FIG. 14).

Figure 14:
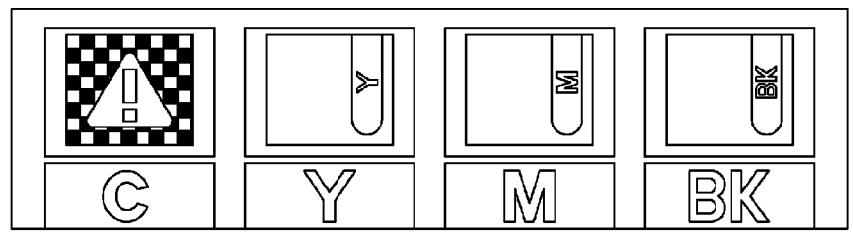
FIG. 14 is a schematic view illustrating an example of marks displayed on a display panel 107.

In addition, when the message of "If the chip unit is not replaced, the printing is paused." (refer to the section C1 in FIG. 6) and the mark in which the exclamation mark is written in the yellow triangle drawn on the white background (refer to FIG. 8) are displayed (blinking), the controller 140 performs an operation to provide display (blinks) a minutely modified message of "Please reset the chip unit or if it is not replaced, the printing will be paused." and a minutely modified mark in which the exclamation mark is written in the yellow triangle drawn on the checkered pattern background (refer to FIG. 14).

Furthermore, the controller 140, when the printing process is performed, does not stop the printing process. That is, the printing process is also similarly maintained (refer to the section B2 in FIG. 11).

Figure 13:
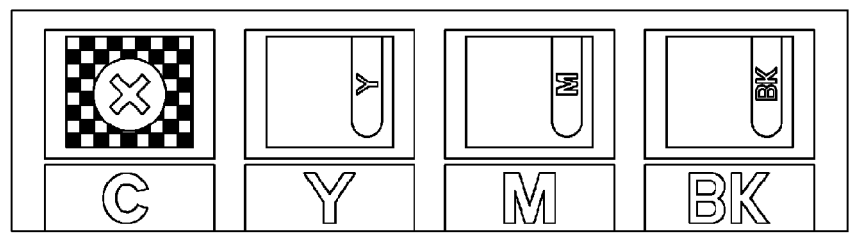
FIG. 13 is a schematic view illustrating an example of marks displayed on a display panel 107.

The reason for the above is as follows. That is, if the printing is stopped only by the read-write error, a user may suffer a large loss. In addition, the reason why the display which has been already shown is minutely modified without largely changing the display of the message of "A chip unit error has occurred. It cannot be correctly recognized. Please reset the chip unit or replace it." or the mark in FIG. 13 is because there is a higher possibility that if the display is largely changed, a user may be surprised (feel an impact) and stop the printing (It is expected that a user who becomes aware that the display which has been already shown is just minutely modified without being erased does not stop the printing and resets the chip unit 180 or replaces it).

Process when Incompatible Chip Unit 180 is Mounted on Chip Unit Mounting Unit 154

As described above, if the chip unit 180 is mounted on the chip unit mounting unit 154, the controller 140 checks whether the chip unit 180 compatible to the chip unit mounting unit 154 is properly mounted thereon or not.

For example, when the chip unit 180 is mounted on the chip unit mounting unit 154C for the C ink, the controller 140 reads the color information of the ink from the chip unit 180, and checks whether the chip unit 180 is the chip unit for the C ink and is not the chip unit for the other colors.

In addition, when the chip unit 180 is mounted on the chip unit mounting unit 154 provided in the printer 100 using the water-based ink, the controller 140 reads the type information of the ink from the chip unit 180, and checks whether the chip unit 180 is the chip unit for the water-based ink and is not the chip unit for an ink of another base.

Then, in this case, the controller 140, when checking that the incompatible chip unit 180 is mounted on the chip unit mounting unit 154 (when checking that the chip unit is for the other colors or when checking that the chip unit is for the other-based ink), performs the following process. That is, when the chip unit 180 is not mounted on a predetermined place (correct place), the controller 140 performs the following process.

That is, the controller 140 performs an operation to display a fact of erroneous mounting on the display panel 107. Specifically, the controller 140 performs an operation to display a message of "A chip unit error has occurred. It cannot be correctly recognized." (refer to F1 in FIG. 12).

In addition to the message, the controller 140 performs an operation to display a first option about whether or not the liquid is injected to the tank 151 after checking the erroneous mounting. Specifically, the controller 140 displays a message of "Is the ink injected after comparing the ink container with a label of the apparatus main body?" (refer to F1 in FIG. 12).

Although not illustrated, a label adheres to the ink container for filling 202 according to the embodiment, and a model number of the corresponding ink jet printer (corresponding to the information indicating the type of the ink) and the color of the ink are described on the label. On the other hand, in the printer 100 according to the embodiment, four labels respectively adhere to the corresponding tanks 151 of four colors. The color of the ink and the model number of the printer 100 are described on the labels. Then, the controller 140 asks a user as to whether or not the ink is injected or introduced after comparing the description on the label of the ink container for filling 202 with the description on the label of the main body of the printer 100.

Here, when a user performs the comparison and then performs (has already performed) the injection of the ink to the tank 151 subsequent to the mounting of the chip unit 180, the user selects "Yes" (corresponding to a positive answer). Specifically, the user touches the display panel 107, selects "Yes" (However, in the embodiment, "Yes" is in default and thus, it is not necessary to select "Yes"), and then selects "OK determination" (refer to F1 in FIG. 12). In the printer 100 according to the embodiment, the same operation can be performed by pressing the operation button 105.

When the positive answer for the first option is input, that is, when "Yes" is selected, the controller 140 receives the information indicating the positive answer, i.e., the controller 140 receives an input indicative of the positive answer. Then the controller 140 receiving the information performs an operation to provide a display prompting to replace the chip unit 180 on the display panel 107. More specifically, the controller 140 displays the message of "A chip unit error has occurred. It cannot be correctly recognized. Please replace the chip unit." and the mark in which the X character is written inside the red circle drawn on the checkered pattern background (refer F2 in FIG. 12).

This is because a user may consider that the authentic ink is injected to the tank 151 (there is no problem in injecting the ink) when the user performs the comparison and then performs the injection of the ink to the tank 151 as the work subsequent to the mounting of the chip unit 180, and that there is a problem (erroneous mounting) only in the mounting of the chip unit 180. Accordingly, this display is performed.

On the other hand, when the user does not perform the comparison and performs (has already performed) the injection of the ink to the tank 151 subsequent to the mounting of the chip unit 180 (hereinafter, referred to as a first case), the user selects "No" (corresponding to a negative answer). In addition, even when the user only performs the mounting of the chip unit 180 and has not yet injected the ink (hereinafter, referred to as a second case), the user selects "No" (corresponding to the negative answer).

Specifically, the user touches the display panel 107, selects "No" and then selects "OK determination" (refer to F1 in FIG. 12).

When the negative answer for the first option is input, that is, when "No" is selected, the controller 140 receives as an input the information indicating the negative answer. Then, the controller 140 receiving the information performs an operation to provide the display indicating the erroneous mounting and the necessity of the comparison on the display panel 107. More specifically, the controller 140 performs an operation to display a message of "A chip unit error has occurred. Please compare the ink container with the label of the apparatus main body (refer to F3 in FIG. 12).

In addition to this message, the controller 140 performs an operation to display a second option about whether or not the wrong liquid is injected into the tank 151. More specifically, the controller performs an operation to display a message of "Is an unspecified ink contained in the tank?" (refer to F3 in FIG. 12). As the second option about whether or not the wrong liquid is contained inside the tank 151, a message of "Is an unspecified ink injected to the tank?" may be displayed. However, this expression may cause a confused user to inject the unspecified ink to the tank 151. Accordingly, it is more preferable to use the message of F3 in FIG. 12.

Here, in the second case, that is, in a case where a user only performs the mounting of the chip unit 180 and has not yet performed the injection, the user selects "No" (corresponding to the negative answer). More specifically, the user touches the display panel 107, selects "No" (However, in the embodiment, "No" is in default and thus, it is not necessarily to select "No"), and then selects "OK determination" (refer to F3 in FIG. 12).

When the negative answer for the second option is input, that is, when "No" is selected, the controller 140 receives, as an input, the information indicating the negative answer. Then, the controller 140 receiving the information performs an operation to provide the display prompting to replace the chip unit 180 on the display panel 107. More specifically, the controller 140 performs an operation to display the message of "A chip unit error has occurred. It cannot be correctly recognized. Please replace the chip unit." and the mark in which the X character is written inside the red circle drawn on the checkered pattern background (refer F2 in FIG. 12).

This is because it is considered that since the ink has not yet been injected to the tank 151, there is no problem in injecting the ink, but there is a problem (erroneous mounting) only in the mounting of the chip unit 180. Accordingly, this display is performed.

On the other hand, in the first case, that is, when a user, without performing the comparison, performs (has performed) the injection of the ink to the tank 151 as the work subsequent to the mounting of the chip unit 180, the user selects "Yes" (corresponding to the positive answer). More specifically, the user touches the display panel 107, selects "Yes", and then selects "OK determination" (refer to F3 in FIG. 12).

When the positive answer for the second option is input, that is, when "Yes" is selected, the controller 140 receives, as an input, the information indicating the positive answer. Then, the controller 140 receiving the information performs an operation to provide the display prompting to contact the manufacturer of the printer 100 on the display panel 107. More specifically, the controller 140 performs an operation to display a message of "A service call is required. An ink system-related error 2136 has occurred (left number is the error number). Please contact the service call center with the above number." (refer to FIG. 4 in FIG. 12). The telephone number of the center, the mail address, or the homepage for repair application may be displayed. The error number may be automatically transmitted to the mail address or the homepage, and the present application adapts the display prompting to contact the center including the above manners.

This is because a user may consider that the non-authentic ink is injected to the tank 151 (there is a problem in injecting the ink) when the user, without performing the comparison, performs the injection of the ink to the tank 151 as the work subsequent to the mounting of the chip unit 180, and that there is a possibility of damage to the printer 100 (mutually different inks are mixed inside the tank 151, thereby causing the printer 100 to be substantially unusable). Accordingly, this display (for example, a display for calling a service engineer) is performed.

In addition, in this case, until the problem is solved (for example, until the service engineer arrives), in order to prohibit the use of the printer 100, a button for turning off the power is displayed on the display panel 107 (refer to F4 in FIG. 12). The user touches the display panel 107, selects the button, and turns off the power of the printer 100.

Incidentally, the user, after turning off the power, waits for the arrival of the service engineer. However, in some cases, the user may have to use the printer 100 for the work and be prepared for damaging the printer 100. Thus, the printer 100 according to the embodiment is capable of coping with the situation for the purpose of emphasizing the convenience of the user.

If the user turns on the power to use the printer 100, the controller 140 performs an operation to display a message of "An ink mixing error has occurred. An ink system-related error 2136 has occurred" on the display panel 107, but in addition to this message, displays a third option as to whether or not the printer has been repaired. More specifically, the controller performs an operation to display a message of "Has our or your designated service engineer repaired the printer?" (refer to F5 in FIG. 12).

Here, when the user is in the above-described situation, the use can select "Yes" (corresponding to the positive answer). More specifically, the user touches the display panel 107, selects "Yes", and then selects "OK determination" (refer to F5 in FIG. 12). It is originally assumed that "Yes" is selected when the printer 100 is restored to a normal state after being repaired. However, even if the printer 100 has not yet been repaired, the user can select "Yes" at the user's own discretion.

Then, when the positive answer for the third option is input, that is, when "Yes" is selected, the controller 140 causes the printer 100 to be in a standby state so that the user can use the printer 100.

In the embodiment, when "Yes" is selected, the controller 140 is adapted to keep a log. Accordingly, when the service engineer arrives later to repair the printer 100, the service engineer can find out that the above-described operation has been performed.

On the other hand, when the user waits for the repair, the user selects "No" (corresponding to the negative answer). More specifically, the user touches the display panel 107, selects "No" (However, in the embodiment, "No" is in default and thus, it is not necessarily to select "No"), and then selects "OK determination" (refer to F5 in FIG. 12).

Then, when the negative answer for the third option is input, that is, when "No" is selected, the controller 140 performs the display of F4 in FIG. 12 again on the display panel 107.

Effectiveness of Control Unit According to Embodiment

As described above, the control unit according to the embodiment (controller 140 corresponds to this), when the chip unit 180 is mounted on the printer 100 (more specifically, the chip unit mounting unit 154 of the printer 100), if the chip unit 180 is not mounted on a predetermined place, displays the fact of the erroneous mounting and the first option as to whether or not the ink is injected to the tank 151 after checking (refer to F1 in FIG. 12). Then, when the negative answer for the first option is input, the control unit displays the second option as to whether the wrong ink is contained inside the tank 151 (refer to F2 in FIG. 12).

Therefore, as described above, it is possible to provide proper measures for a user after properly distinguishing a case where the authentic ink is injected to the tank 151 from a case where the authentic ink is not injected to the tank 151 (that is, the first case and the second case). Accordingly, the convenience of the user can be improved.

In the embodiment, when the positive answer for the second option is input, it is configured to perform the display prompting to contact the manufacturer of the printer 100.

Therefore, as described above, it is possible to provide measures suitable for the first case for the user after properly distinguishing the first case from the second case. Therefore, the convenience of the user can be further improved.

Another Embodiment

The above-described embodiments are intended to facilitate the understanding of the invention, and are not construed as limiting the invention. The invention, without departing from the spirit thereof, can be modified or improved. The invention, of course, includes the equivalents thereof. In particular, even the embodiment described below is included in the invention.

In the above-described embodiment, a liquid discharge apparatus (liquid ejecting apparatus) is embodied as the ink jet type printer, but may employ a liquid ejecting apparatus ejecting or discharging a liquid other than the ink, and can be used for various liquid ejecting apparatuses including a liquid ejecting head discharging a micro amount of droplet. The droplet means a state of the liquid discharged from the liquid ejecting apparatus, and includes a granular shape, a teardrop shape, and a thread shape leaving a trail. In addition, the liquid described herein may be a material which can be ejected by the liquid ejecting apparatus. For example, the liquid may be the substance in a liquid phase, and includes not only a high or low viscous liquid state, a flow state such as sol, gel water, other inorganic solvent, organic solvent, solution, liquid resin and liquid metal (metal melt), or the liquid as one state of the substance, but also those in which particles of a functional material consisting of a solid matter such as pigment or metal particles are dissolved, dispersed or mixed in the solvent. In addition, a representative example of the liquid includes the ink described in the embodiments or liquid crystal. Here, the ink includes various types of liquid composition such as a general water-based ink, an oil-based ink, a gel ink and a hot melt ink. A specific example of the liquid ejecting apparatus may include a liquid ejecting apparatus ejecting a liquid containing a dispersed or dissolved material such as an electrode material and a color material which are, for example, used for manufacturing a liquid crystal display, an electroluminescence (EL) display, a surface emitting display and a color filter, a liquid ejecting apparatus ejecting a living organic material used for manufacturing a biochip, a liquid ejecting apparatus ejecting a liquid which is a sample used as a precision pipette, printing equipment, and a micro dispenser. Further, the embodiments may employ a liquid ejecting apparatus ejecting a lubricant onto a precision machine such as a timepiece and a camera by using a pinpoint, a liquid ejecting apparatus ejecting a transparent resin liquid such as a UV-curing resin onto a substrate in order to form a minute hemispherical lens (optical lens) used in an optical communication element, and a liquid ejecting apparatus ejecting an etchant such as acid or alkali in order to etch a substrate. The invention can be applied to any one type of these ejecting apparatuses.

In addition, in the above-described embodiments, a so-called refill type (type having the tank 151 which is fillable with the ink) printer 100 has been described by way of example, but the embodiments can also be applied to the other type printer 100 such as a so-called cartridge type in some cases.

In addition, in the above-described embodiments, various displays are performed on the display panel 107 disposed in the printer 100, but without being limited thereto, for example, may be performed on a display device of a computer in which a printer driver is installed. Then, in this case, a control related to the display is performed by the printer driver or in cooperation of the print driver and the controller 140. That is, in the above-described embodiments, the controller 140 is exemplified as the control unit, but without being limited thereto, may be the print driver or may be the printer driver and the controller 140.

REFERENCE SIGNS LIST

1 Printing sheet
3 Computer
100 Printer
101 Sheet feed tray
102 Sheet discharge port
103 Front surface cover
105 Operation button
107 Display panel
110 Carriage
112 Ejecting head
114 Drive mechanism
116 Sheet feed mechanism
117 Ink tube
130 Guide rail
140 Controller
141 Interface unit
142 CPU
143 Unit control unit
144 Memory
150 Tank case
151 Tank
151Y Tank for Y ink
151M Tank for M ink
151C Tank for C ink
151BK Tank for BK ink
152 Checking window (Opening)
153 Lid
154 Chip unit mounting unit
154Y Chip unit mounting unit for Y ink
154M Chip unit mounting unit for M ink
154C Chip unit mounting unit for C ink
154BK Chip unit mounting unit for BK ink
156 Chip unit read-write unit
156Y Chip unit read-write unit for Y ink
156M Chip unit read-write unit for M ink
156C Chip unit read-write unit for C ink
156BK Chip unit read-write unit for BK ink
158 Detector group
159 Ink end detector
180 Chip unit
200 Ink for filling
202 Ink container for filling
204 Package

The invention claimed is:

1. A controller for use in a liquid ejecting apparatus including a tank that stores an amount of liquid and a removable read-write storage attachable and detachable from the liquid ejecting apparatus independently from the tank, wherein the removable read-write storage holds information associated with a consumption amount of the liquid, and wherein the controller displays error information when the removable read-write storage is erroneously mounted to a position of the liquid ejecting apparatus.

2. The controller according to claim 1,
wherein the controller receives an input associated with a relationship between color information of the tank and color information of the liquid to refill the tank.

3. The controller according to claim 2,
wherein the controller deactivates the liquid ejecting apparatus, when the received input that the color information of the tank and the color information of the liquid to refill the tank do not correspond to each other.

4. The controller according to claim 2,
wherein the control unit controls a display device to display a message to contact a manufacturer of the liquid ejecting apparatus when the received input indicates that the color information of the tank and the color information of the liquid injected to the tank do not correspond to each other.

5. The controller according to claim 1,
wherein the controller is configured to display first information about whether or not the tank is refilled with the liquid which corresponds with the tank.

6. The controller according to claim 1,
wherein the liquid ejecting apparatus has a plurality of the tanks and a plurality of the read-write storages, and the read-write storage is a one-to-one correspondence with one of the tanks.

7. A liquid ejecting apparatus comprising:
a liquid flow channel connected to a tank and extending to an ejecting head, the liquid flow channel being configured to allow a liquid contained in the tank to flow therethrough, the tank being disposed outside of a space within which the ejecting head moves and within a tank case;
a mounting unit on which a removable read-write storage material is mounted, the mounting unit and the read-write storage material being mounted independently from the tank, wherein the removable read-write storage holds an amount that is associated with a consumption information of the liquid; and
a controller that displays error information when the removable read-write storage material is erroneously mounted to a position of the mounting unit.

8. The liquid ejecting apparatus according to claim 7, wherein the read-write storage material is a chip unit with a chip.

9. The liquid ejecting apparatus according to claim 7, wherein the tank case is disposed to a side of a main body of the liquid ejecting apparatus.

10. The liquid ejecting apparatus according to claim 9, wherein the tank is not attachable to and detachable from the tank case to refill the tank.

11. The liquid ejecting apparatus according to claim 7, wherein the controller receives an input indicative of a relationship between the color information of the tank and the color information of the liquid to be injected into the tank, the input being provided through operation buttons.

12. The liquid ejecting apparatus according to claim 11, wherein the controller is configured to deactivate the liquid ejecting apparatus when the received input indicates that the color information of the tank and the color information of the liquid to be injected to the tank do not correspond to each other.

13. The liquid ejecting apparatus according to claim 11, wherein the controller controls the display a message to contact a manufacturer of the liquid ejecting apparatus when the input indicates that the color information of the tank and the color information of the liquid to be injected to the tank do not correspond to each other.

14. A liquid ejecting apparatus comprising:
a liquid flow channel connected to a tank in which color information has been set, the liquid flow channel being configured to allow a liquid contained in the tank to flow therethrough, the tank being disposed within a tank case separated from an ejecting head by a wall of a main body of the liquid ejecting apparatus;
a mounting unit on which a read-write storage material storing the color information is mounted, wherein the storage material holds information that is associated with a consumption amount of the liquid, the mounting unit and the read-write storage material being mounted independently from the tank and being separated from the ejecting head by the wall of the main body; and
a controller configured to compare the color information of the tank and the color information stored in the read-write storage material and display first information associated with a status of a liquid associated with the tank when the color information of the tank and the color information stored in the storage material do not correspond and after the read-write storage material is mounted on the mounting unit.

15. The liquid ejecting apparatus according to claim 14, wherein the controller is configured to display the first information when the controller receives an input associated with the status of the liquid associated with the tank.

16. The liquid ejecting apparatus according to claim 15, wherein the controller is configured to control a display panel to display a message to contact a manufacturer of the liquid ejecting apparatus when the received input that the color information of the tank and the color information of the liquid injected to the tank do not correspond to each other.

17. The liquid ejecting apparatus according to claim 15, wherein the controller deactivates the liquid ejecting apparatus, when the received input that the color information of the tank and the color information of the liquid injected to the tank do not correspond to each other.

* * * * *